Sept. 25, 1928.

S. F. BAUWENS 1,685,626

MACHINE FOR USE IN MAKING BOXES

Filed Aug. 9, 1923

INVENTOR.
Seraphine F. Bauwens
BY Edward Dunne Jr.
ATTORNEY.

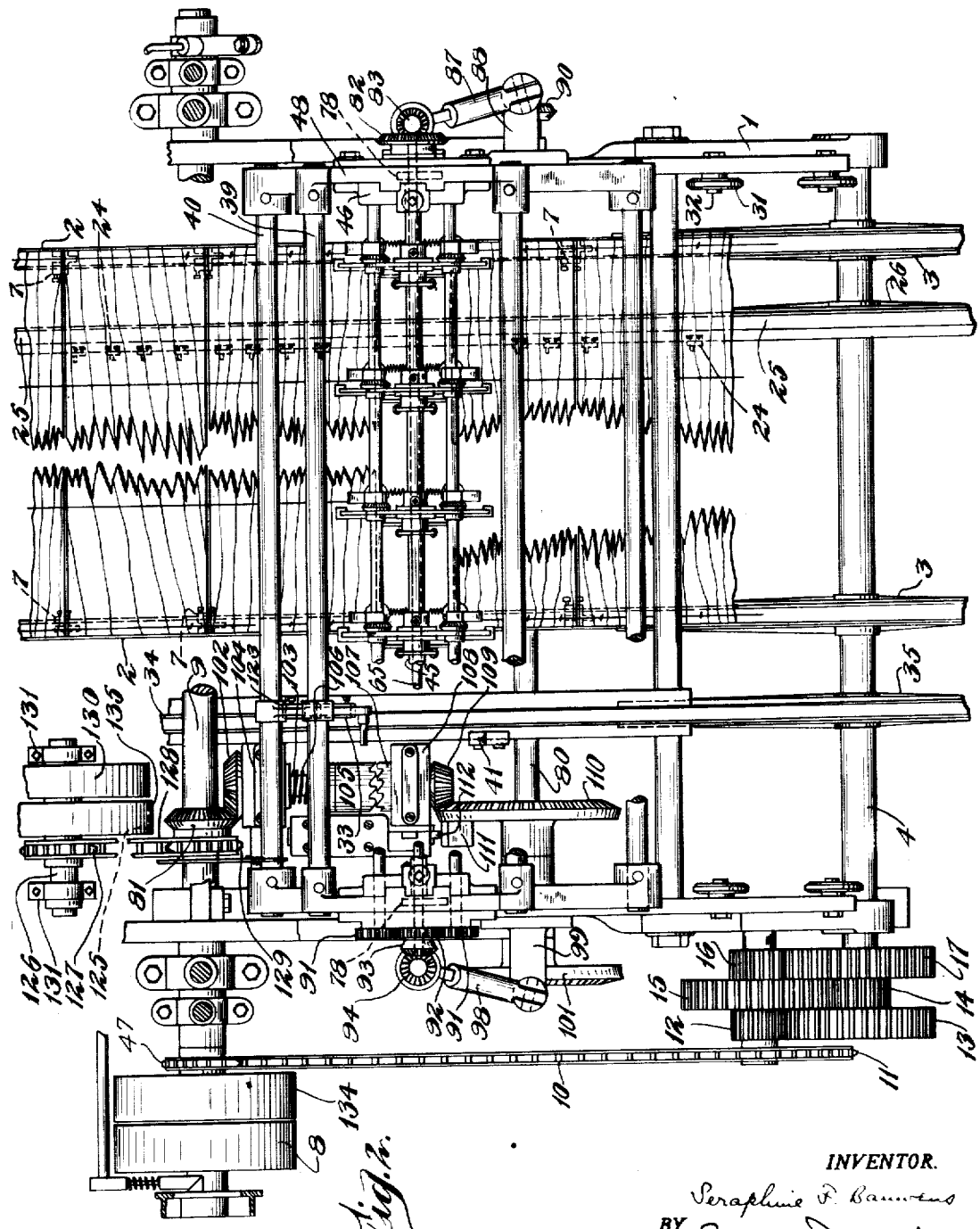

Sept. 25, 1928.
S. F. BAUWENS
1,685,626
MACHINE FOR USE IN MAKING BOXES
Filed Aug. 9, 1923　　9 Sheets-Sheet 3
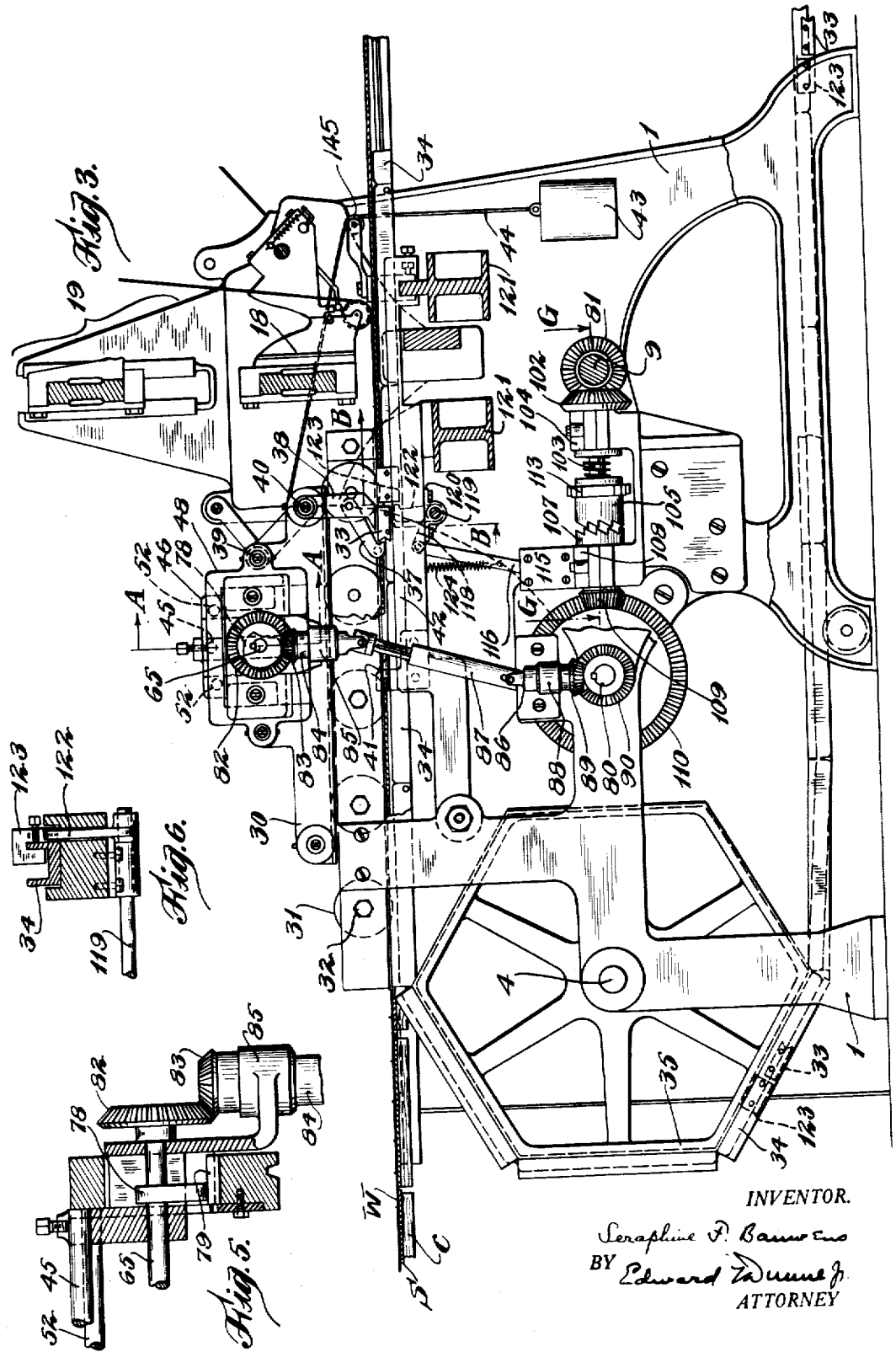
INVENTOR.
Seraphine F. Bauwens
BY Edward Dunne Jr.
ATTORNEY

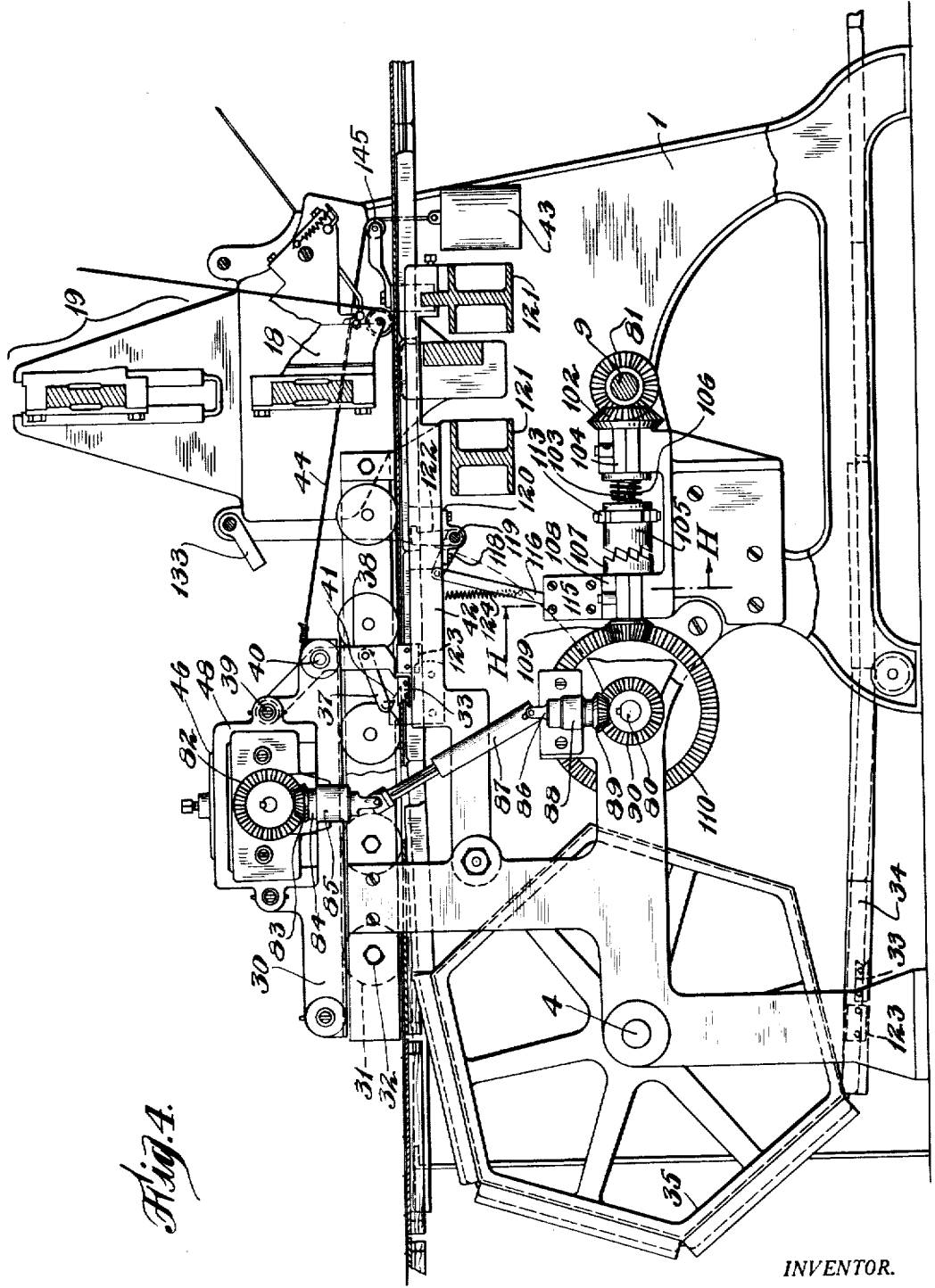

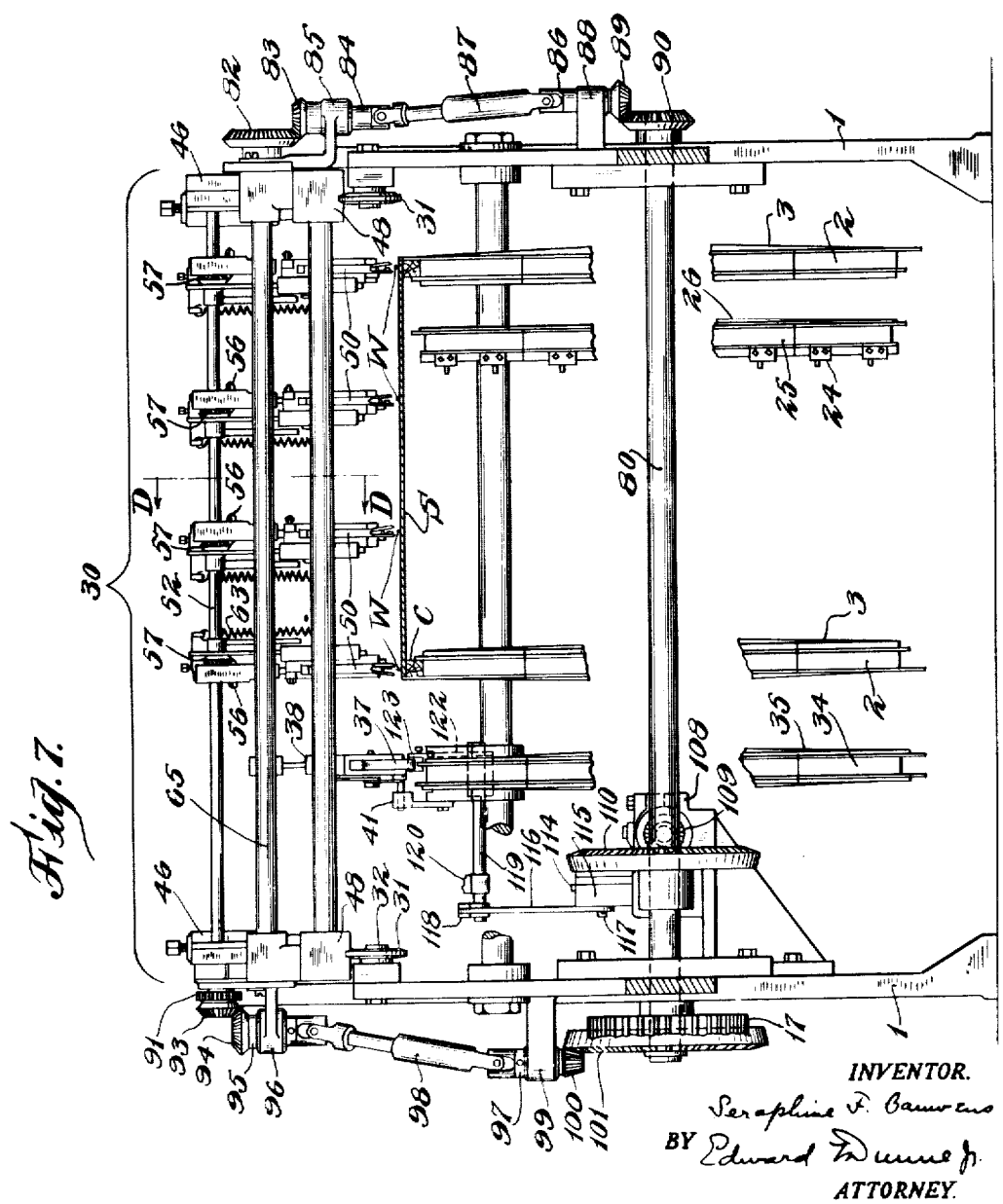

Sept. 25, 1928.
S. F. BAUWENS
1,685,626
MACHINE FOR USE IN MAKING BOXES
Filed Aug. 9, 1923
9 Sheets-Sheet 6
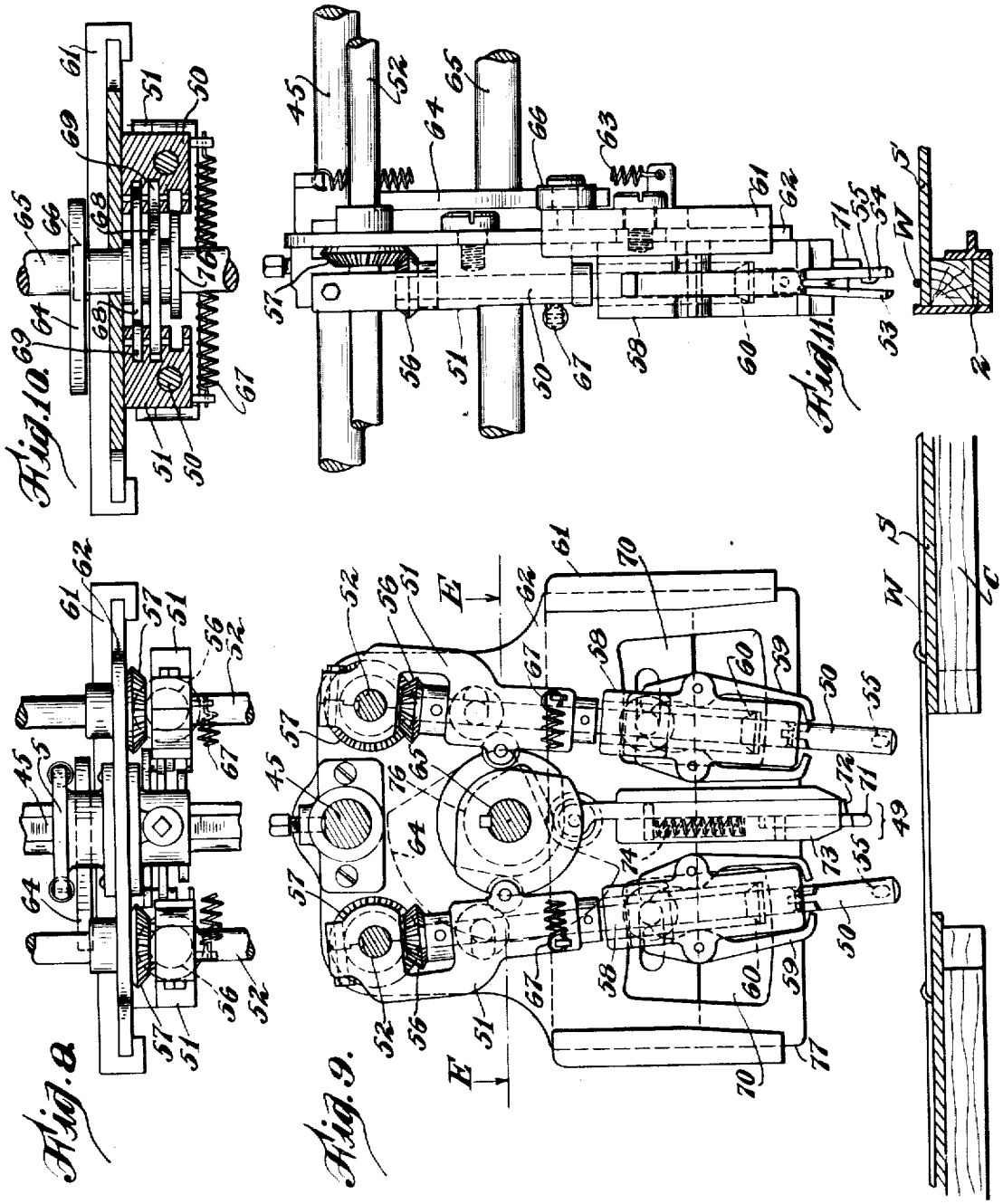
INVENTOR.
Seraphine F. Bauwens
BY Edward Townend Jr.
ATTORNEY

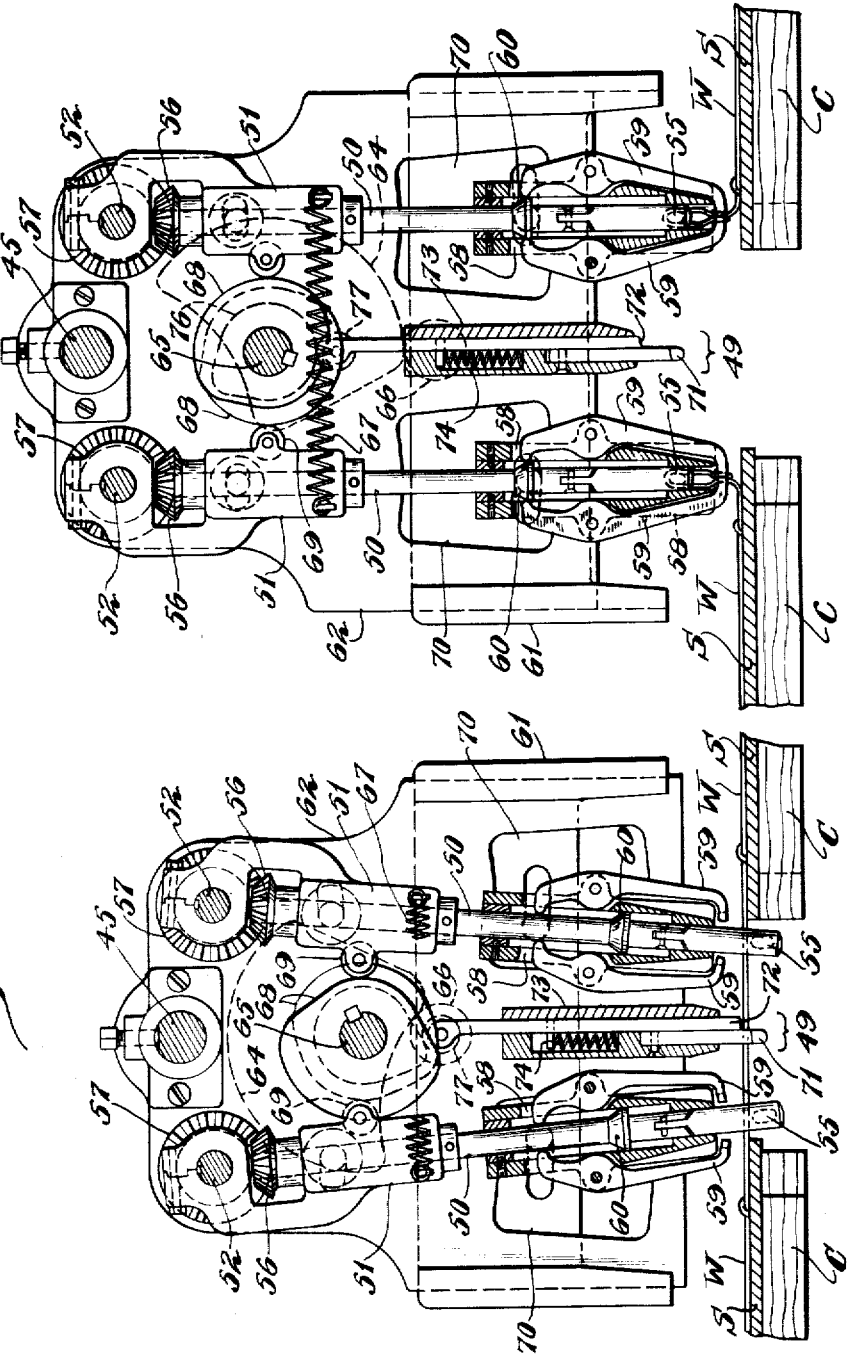

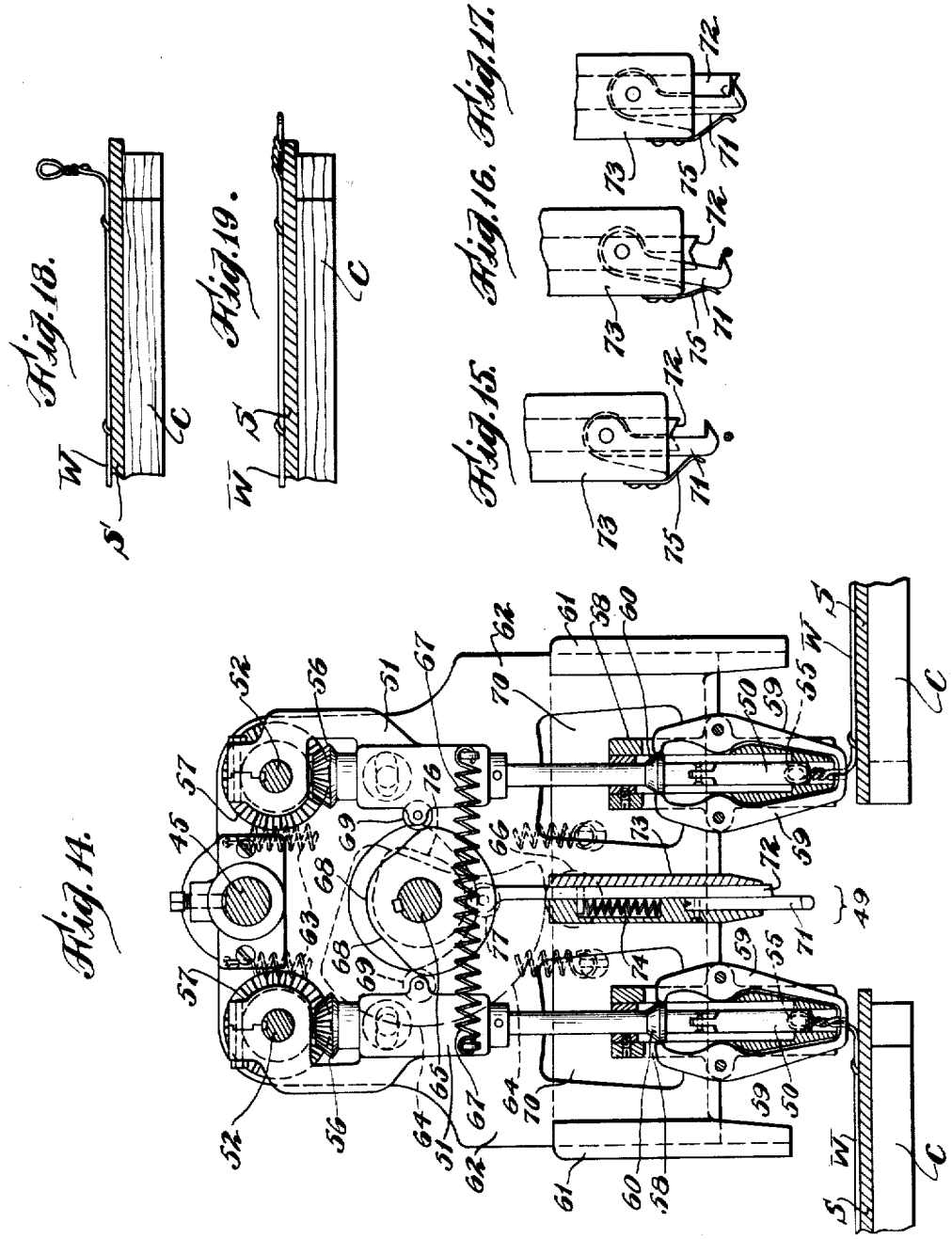

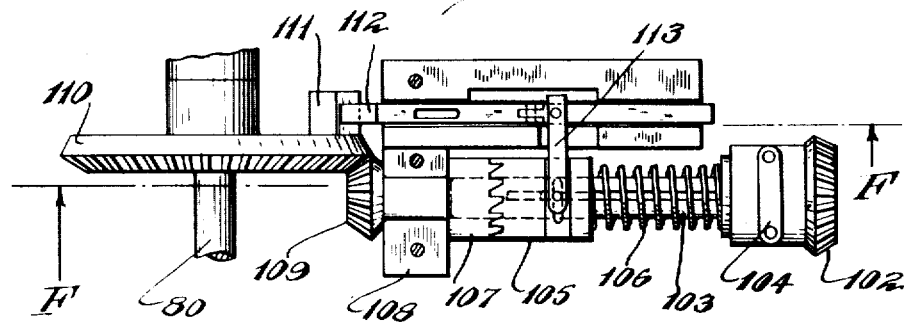
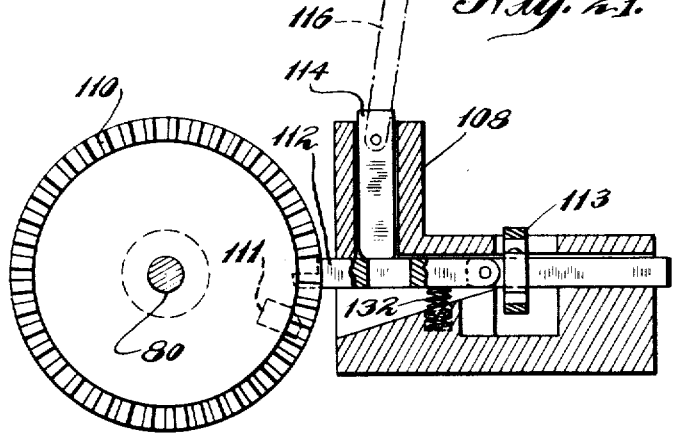
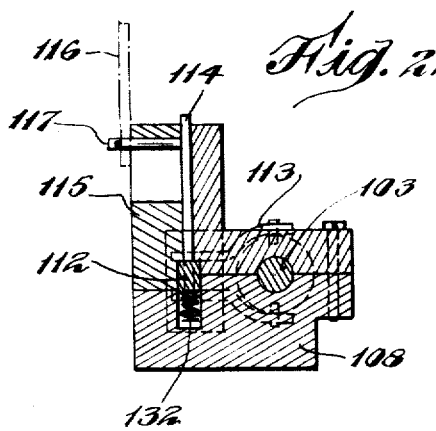

Patented Sept. 25, 1928.

1,685,626

UNITED STATES PATENT OFFICE.

SERAPHINE F. BAUWENS, OF CHICAGO, ILLINOIS, ASSIGNOR TO WIREBOUND PATENTS COMPANY, A CORPORATION OF MAINE.

MACHINE FOR USE IN MAKING BOXES.

Application filed August 9, 1923. Serial No. 656,555.

This invention relates to machines and apparatus for use in making boxes, crates, box or crate blanks, and parts thereof, and, among other objects, is intended to provide an efficient machine for assembling and securing together box parts, applying binding-wire thereto, severing the binding-wire between box parts and supplying the wire ends with fastening means for connection with other box parts.

In the drawings:

Fig. 2 is an enlarged top plan view of the delivery end of the machine showing the wire-severing and fastener-supplying mechanism.

Fig. 3 is a side elevation of the delivery end of the machine, certain parts being broken away for clearness of illustration; said figure shows the wire-severing and fastener-supplying mechanism in the position occupied by it at the start of a wire-severing and fastener-supplying operation.

Fig. 4 is similar to Fig. 3 but shows the position of the wire-severing and fastener-supplying mechanism at the finish of a wire-severing and fastener-supplying operation.

Fig. 5 is an enlarged detailed sectional view taken on the line A—A of Fig. 3.

Fig. 6 is an enlarged detailed sectional view taken on the line B—B of Fig. 3.

Fig. 7 is an enlarged end elevation of the wire-severing and fastener-supplying mechanism seen from the line C—C of Fig. 1, certain parts of the machine being omitted for clearness of illustration.

Fig. 8 is an enlarged top plan view of one of the wire-severing and fastener-supplying units.

Fig. 9 is an enlarged side elevation of one unit of the wire-severing and fastener-supplying mechanism taken on the line D—D of Fig. 7, and showing said unit suspended above the work in the position occupied by it immediately preceding a wire-severing and fastener-supplying operation.

Fig. 10 is a sectional view taken on the line E—E of Fig. 9.

Fig. 11 is an end view of the wire-severing and fastener-supplying unit shown in Fig. 9.

Fig. 12 is a side elevation partly in section of one of the wire-severing and fastener-supplying units in lowered position with the wires in place between the twisting jaws and about to be severed between the twisting heads.

Fig. 13 is a similar view showing the wire-severing and fastener-supplying unit in a raised position after the wire has been severed and bent and ready for twisting.

Fig. 14 is a similar view after the twisting operation.

Fig. 15 is a detailed view of the wire-severing mechanism in raised position.

Fig. 16 is a similar view of the wire-severing mechanism as it is being lowered to cutting position and showing how the wire forces the lower cutting member to one side as it is lowered against the wire.

Fig. 17 is a similar view showing the cutting operation.

Fig. 18 is a perspective of a portion of a wire-bound box blank showing the character of the fastener supplied by the machine.

Fig. 19 is a similar view showing the fastener bent parallel to the side of the blank.

Fig. 20 is an enlarged view of the clutch mechanism for operating the wire-severing and fastener-supplying mechanism.

Fig. 21 is a sectional view taken on the line F—F of Fig. 20.

Fig. 22 is an enlarged end elevation partly in section taken on the line H—H of Fig. 4.

Figure 1:
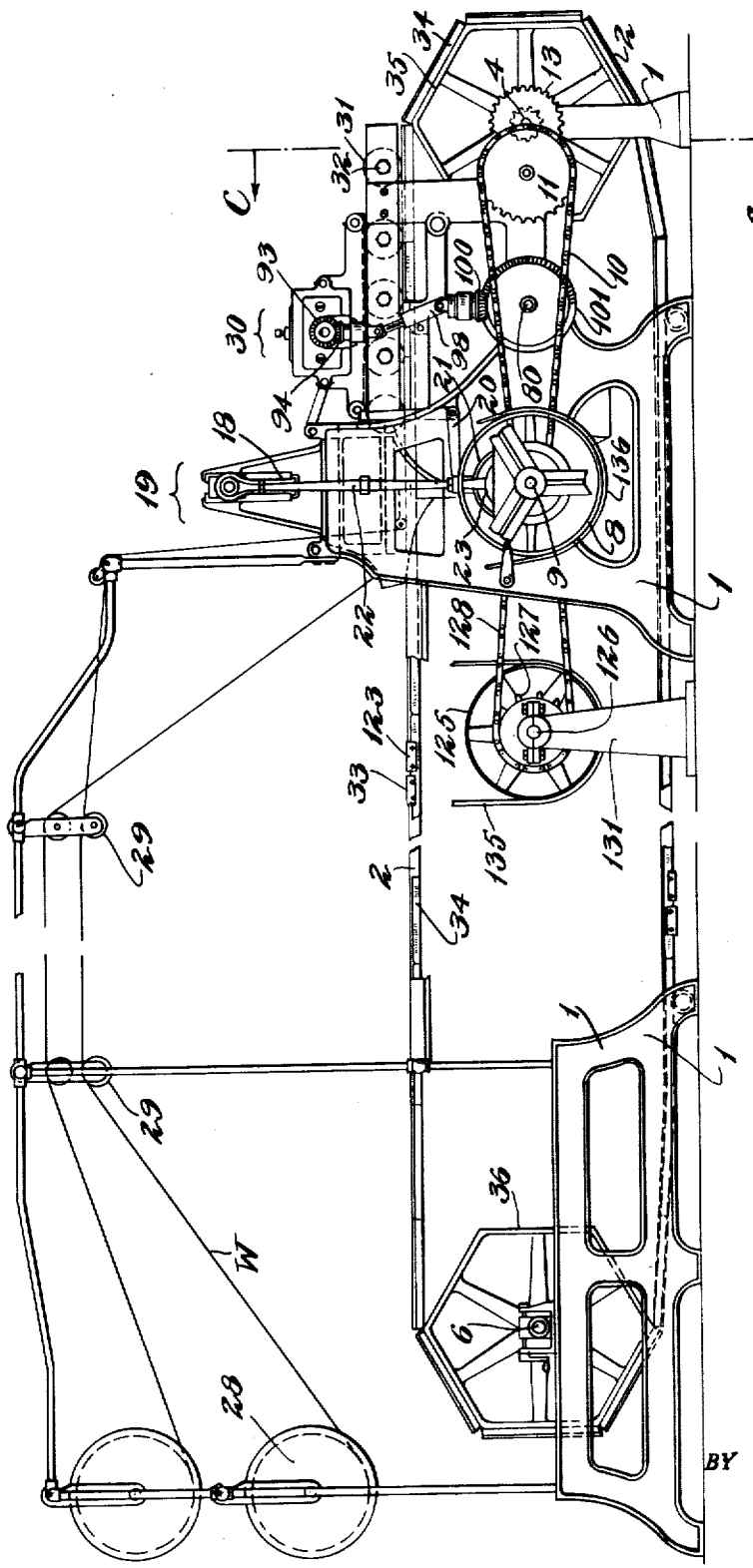
Fig. 1 is a side elevation of one type of wire-bound box blank machine embodying the invention.

The machine selected for illustration is of the type disclosed in United States patent to Osceola C. Thompson, No. 1,595,033, dated August 3, 1926, in which the box parts are fed continuously past stapling mechanism which applies binding wire to the moving box parts and in which the operations of the stapling mechanism are controlled to position the staples at predetermined points in the work; but it will be understood that the invention is not limited to the particular type of machine disclosed in said Thompson patent as it may be embodied in other types of machines, such, for example, as the intermittent feed type of machine shown in reissued patent to Thompson No. 15,045 of February 15, 1921.

The illustrative machine is designed to receive and position in proper relationship a plurality of sections of cleats C and side sheets S for a box blank and feed them past the stapling, wire-severing and fastener-supplying mechanisms, which, acting in turn, staple binding wire to the box parts, sever the binding wire between box parts and supply the severed ends with fastening means whereby one box part may be subsequently connected with another box part.

The work-feeding, binding-wire-applying, binding-wire-severing, and fastener-supplying mechanisms are all supported between side frame members 1 suitably connected and braced by cross-beams.

The work-feeding means comprises a pair of endless link chains 2 preferably channel-shaped to receive the cleats C, which chains ride on supports and are trained over driven sprocket wheels 3 on a shaft 4 at the delivery end of the machine and over idler sprocket wheels (not shown) on a shaft 6 at the receiving end of the machine. Spacer blocks 7 are adjustably secured by set screws to the chains 2 at proper intervals to position the cleats C and side sheets S in proper spaced relationship. The chains 2 are preferably long enough to position several box blanks with sufficient spaces between blanks to provide the necessary extensions of wire to be supplied with fastening means for connection with other box parts. The chains 2 may be lengthened or shortened by the insertion or removal of chain links, and are also relatively adjustable laterally to accommodate boxes of different dimensions.

The work-feeding chains 2 are advanced continuously at approximately a uniform speed by power communicated to sprocket shaft 4 from a sprocket wheel 47 on the hub of a drive pulley 8 revolubly mounted on a shaft 9 acting through a sprocket chain 10 and sprocket wheel 11 and reduction spur gears 12, 13, 14, 15, 16 and 17, all as shown and described in said Thompson Patent No. 1,595,033.

Staplers 18 of the type adapted to form staples from staple stock wire automatically fed thereto and drive the same over the binding wire into the box parts are carried by a stapler carriage 19 which is reciprocated horizontally over the moving work by bell crank levers 20 operated by eccentrics 21 on shaft 9, and the staplers 18 are operated through pitman 22 and eccentrics 23 on shaft 9, all as shown and described in detail in said Thompson Patent No. 1,595,033; it being sufficient here to say that upon each revolution of shaft 9 the stapler carriage 19 is caused to move with the work a certain distance, during which time the staplers are operated once and then the stapler carriage is returned to initial position where it remains inactive until shaft 9 is again revolved.

Shaft 9 is caused to revolve at selected times through a controllable clutch mechanism between the drive pulley 8 and the stapler shaft 9, which clutch, when thrown into operation, clutches stapler shaft 9 to drive pulley 8 for one revolution and then automatically disconnects. The clutch is thrown into operation by stapler-controlling blocks 24 adjustably secured by set screws to a chain 25 preferably equal in length to work-feeding chains 2 and trained over driven sprocket wheel 26 on shaft 4 and an idler sprocket wheel (not shown) on shaft 6, thus causing chain 25 to move synchronously with work-feeding chains 2. The blocks 24 are set relative to points on the work where staples are desired and each block as it reaches the stapling plane operates the clutch between the drive pulley 8 and stapler shaft 9 to cause a stapling operation. The clutch mechanism and its controlling and operating means is fully described in said Thompson Patent No. 1,595,033, reference to which is hereby made for a more detailed description.

The binding wires are carried by supply reels 28 supported by the upper framework of the machine and pass over rollers 29 also supported by the upper framework, hence under rollers (not shown) at the feet of the staplers and are pulled along by reason of their attachment to the moving work.

After the staplers have secured the binding wires to the box sections, the work-feeding chains present the wire-connected sections to the wire-severing and fastener-supplying mechanism next described, which automatically severs the wires between blanks or box parts and supplies the severed ends of the wires with fastening means; said severing and fastener-supplying mechanisms operating to perform their functions without interrupting the feed of the work through the machine.

The particular character of fastener supplied by the illustrative machine is shown in Figs. 18 and 19 and consists of a bight formed directly on the wire end by bending the wire in the form of a loop and intertwisting the free end with the body of the wire.

The wire-severing and fastener-supplying mechanism consists of a plurality of units (one for each binding wire to be severed and supplied with fastening means) mounted on a carriage 30, each unit adapted to sever the binding wire between box blanks or box parts and supply the severed ends with fastening means of the character illustrated.

The carriage 30 is reciprocable longitudinally of the work on rollers 31 mounted on stud shafts 32 supported by the side frames of the machine. The carriage 30 is caused to move with the work during wire-severing and fastener-supplying operations and then to return to initial position where it remains inactive until again moved with the work for another wire-severing and fastener-supplying operation, the movement of the carirage being controlled to cause the wires to be severed and the fasteners supplied at selected points relative to edges of box sections or blanks.

The carriage 30 is moved with the work by means of blocks 33 adjustably secured at intervals to a chain 34 trained over driven sprocket wheel 35 on shaft 4 and over idler sprocket wheel 36 on shaft 6, which blocks 33 propulsively engage a pawl 37 pivoted from a bracket 38 supported by cross-rods 39 and 40 of the carriage 30. The chain 34 is preferably equal in length to work-feeding chains 2 and the sprocket wheels 35 and 36 are of the same size and shape as the sprocket wheels over which work-feeding chains 2 are trained, so that chain 34 travels synchronously with work-feeding chains 2 and the work. Pawl 37 is disengaged from block 33 by riding up on a cam surface 41 carried by chain-support 42 and when pawl 37 is disengaged from block 33, carriage 30 is returned to initial position against a stop 133 by means of a weight 43 carried by a cable 44 suspended over roller 145 and secured to cross-rod 40 of carriage 30. The blocks 33 are located on chain 34 relative to points on the work where it is desired that the wires be cut and fasteners supplied so that when such points reach the wire-severing and fastener-supplying mechanism the carriage 30 is moved synchronously with the work until the wire-severing and fastener-supplying mechanism has completed its operations, it being understood that as soon as the carriage 30 starts to move with the work the several units of wire-severing and fastener-supplying mechanisms are thrown into operation for one complete operation and are then thrown out of operation and remain inactive while the carriage is returned to initial position and until the carriage 30 is again moved forward with the work.

The several wire-severing and fastener-supplying units are adjustably secured longitudinally of and supported by cross-rod 45 extending between slidable bearings 46, which bearings are reciprocable vertically on side frames 48 of the carriage 30, thus permitting the lowering and raising of the several units to engage and operate upon the wires as hereinafter explained.

As best shown in Figs. 8 to 17 inclusive, each wire-severing and fastener-supplying unit consists of a wire cutter 49 and two twisting heads 50 normally suspended above the work, as shown in Fig. 9, and adapted when thrown into operation to descend, engaging and severing the wire as shown in Fig. 12, then to ascend forming the bights as shown in Fig. 13 and twisting the legs thereof as shown in Fig. 14. Upon completion of the twisting operation, the parts will assume the position shown in Figs. 9 and 11 with the twister jaws expanded to release the completed fastener.

The twister heads 50 are revolubly mounted in bearings 51 which are pivotally suspended from twister shafts 52 journaled in bearings 46 vertically slidable on side frames 48 of carriage 30, and are provided at their lower extremities with relatively movable jaws 53 and 54 normally held open by a compression spring so that when lowered they are adapted to receive a binding wire between them. One of said jaws is provided with a forming stud 55 about which the wire is bent to form a loop when the jaws are closed and raised.

For revolving twister heads 50 to twist the legs of the bight, the upper extremity of each twister head is provided with a pinion 56 which meshes with a pinion 57 carried upon twister shaft 52. which shaft is operated in the manner hereinafter described.

The mechanism for closing twister jaws 53 and 54 upon the wires and for clamping the legs of the bight during the twisting operation consists of a casing 58 slidable vertically on twister head 50 and two clamping arms 59 pivotally mounted at either side of casing 58 as shown in Figs. 9, 12, 13 and 14, which casing when lowered forces jaws 53 and 54 together and causes clamping arms 59 to close upon the legs of the bight as shown in Fig. 13; the clamping arms being actuated by a cam surface 60 on twister head 50. Casing 58 is bolted to a sleeve 61 slidable vertically on a plate 62 bolted to twister-head-bearing 51; sleeve 61 being held in its uppermost position by springs 63 secured to a bracket 5 bolted to plate 62. Thus when sleeve 61 is forced downward against the action of springs 63, as hereinafter explained, casing 58 travels downward on twister head 50, closing jaws 53 and 54, and the same downward movement of sleeve 61 causes clamping arms 59 to travel downward and when the upper extremities of clamping arms 59 strike cam surface 60 on twister head 50, their lower extremities are forced together clamping the legs of the bight; it being understood that the parts are so arranged that the clamping arms 59 are closed at the proper time, i. e., when their lower extremities have descended below the twister jaws 53 and 54.

Sleeve 61 is caused to move downward by a cam 64 on cam shaft 65 acting on a roller 66 on sleeve 61; cam shaft 65 being journaled in slidable bearings 46. Cam 64 is appropriately formed to cause casing 58 and the clamping arms 59 to be lowered at the proper time and held in lowered position during the twisting operation.

A spring 67 holds twister heads 50 in the closed position, shown in Fig. 9, during the time the twister heads are inactive and while they are being lowered into position for a severing and fastener-supplying operation. After the heads have engaged the wires and the wires have been severed, as hereinafter explained, and when the twister heads are rising above the plane of the work, the twister heads 50 are forced apart and assume the perpendicular positions shown in Fig. 13, thus bending the wire about the forming stud 55 and forming the bight in a vertical position for the twisting operation. Twister heads 50 are forced apart by cams 68 on cam shaft 65 acting on rollers 69 carried by bearings 51. Openings 70 are provided in plate 62 to permit relative movement of twister heads 50.

Wire cutter 49 for severing the binding wire is located between twister heads 50 and consists of a pair of cutting knives 71 and 72, knife 71 being pivotally carried by a casing 73 bolted to plate 62, and knife 72 being slidable vertically in said casing 73 and maintained in raised position by a compression spring 74. As shown in Figs. 15, 16 and 17, when the plate 62 is lowered, knife 71 is kicked to one side by the binding wire and snaps in beneath the wire through the action of a spring 75. Knife 72 is then lowered by a cam 76 on cam shaft 65 acting on a roller 77 carried by the upper extremity of knife 72, the wire being severed between the knives as shown in Fig. 17.

The lowering and raising of the wire-severing and fastener-supplying units is controlled by cams 78 at either end of cam shaft 65 acting on rollers 79 carried by side frames 48 of carriage 30; the weight of the units being sufficient to keep cams 78 in contact with rollers 79.

It will thus be seen that the raising and lowering of the several units and the cutting and gripping and bending of the wires is caused by revolving cam shaft 65, and that the twisting heads are caused to rotate to twist the legs of the bight by revolving twister shafts 52.

Cam shaft 65 and twister shafts 52 are operated through connections with a shaft 80 journaled in the side frames of the machine, which shaft 80 is caused to make one revolution at selected times by means of a controllable clutch connection with a constantly rotating pinion 81 revolubly mounted on stapler shaft 9, all as presently described.

As best shown in Figs. 2, 3, 4, 5 and 7, cam shaft 65 is provided at one end with a pinion 82 meshing with a pinion 83 on a shaft 84 revolubly mounted in a bearing 85 secured to slidable bearings 46 of carriage 30. The lower end of shaft 84 is connected to the upper end of a shaft 86 by a telescopic universal joint connection 87. Shaft 86 is revolubly mounted in a bearing 88 secured to the side frame of the machine. The lower end of shaft 86 is provided with a pinion 89 meshing with a pinion 90 on one end of shaft 80 (the right end, viewing Figs. 2 and 7). The size and proportion of the pinions are such that one revolution of shaft 80 causes one revolution of cam shaft 65.

As best shown in Figs. 2 and 7, twister shafts 52 are each provided at one end with a gear 91 meshing with a gear 92 revolubly mounted on cross-rod 45 of carriage 30. Gear 92 is provided with a pinion 93 meshing with a pinion 94 on the upper end of a shaft 95 revolubly mounted in a bearing 96 secured to slidable bearing 46 of carriage 30. The lower end of shaft 95 is connected to the upper end of a shaft 97 by a telescopic universal joint connection 98. Shaft 97, which is revolubly mounted in a bearing 99 secured to the side frame of the machine, is provided at its lower end with a pinion 100 meshing with a mutilated pinion 101 carried by shaft 80. The mutilation of pinion 101 and the size and proportion of the pinions and gears is such that upon one revolution of shaft 80 the twister shafts 52 will be rotated at the proper time and for a sufficient length of time to cause the twister heads 50 to securely twist the legs of the bights when they have been formed.

Shaft 80 is operated from a pinion 81 revolubly mounted on shaft 9 as follows: Pinion 81 meshes with a pinion 102 on a shaft 103 journaled in a bearing 104 secured to the frame of the machine. The other end of shaft 103 is provided with a toothed clutch member 105 slidable longitudinally of shaft 103 on a keyway and pressed toward the end of the shaft by a compression spring 106 interposed between clutch member 105 and bearing 104. Clutch member 105, when not restrained as hereinafter described, is forced by spring 106 into engagement with a clutch member 107 journaled in bearing 108 secured to the side frame of the machine. Clutch member 107 is provided with a pinion 109 which meshes with a pinion 110 keyed to shaft 80 so that when clutch members 105 and 107 are permitted to interengage, shaft 80 will be rotated until the interengagement of the clutch members 105 and 107 is broken.

Clutch member 105 is held back from engagement with clutch member 107 by means of a cam 111 on pinion 110 acting on a rod 112 slidable in bearing 108 and attached to a bracket 113 carried by clutch member 105 so that when cam 111 is in engagement with rod 112, as shown in Fig. 2, clutch member 105 is forced back against the action of spring 106 and is held free of engagement with clutch member 107.

Rod 112 is released from engagement with cam 111 to permit engagement of clutch members 105 and 107 through the action of a plunger 114 vertically slidable in a casing 115 which plunger when forced downward upon the end of rod 112 depresses said end below the cam 111 whereupon spring 106 forces clutch member 105 into engagement with clutch member 107. As shown in Figs. 20 and 21, rod 112 consists of two parts pivotally connected so as to permit the end nearest the cam 111 to be lowered by plunger 114 against the action of a spring 132.

Plunger 114 is forced downward upon the end of rod 112 at selected times through the action of a lever 116 having a pin and slot connection at its lower end with a stud 117 secured to plunger 114 and having a similar connection at its upper end with a lever 118 keyed to a rock shaft 119 journaled in a bearing 120 secured to one of the cross-bars 121 of the machine. When rock shaft 119 is rocked in a counter-clockwise direction (viewing Fig. 3) plunger 114 will be forced downward upon the end of rod 112 forcing the end of rod 112 below cam 111 and permitting spring 106 to force clutch member 105 into engagement with clutch member 107.

Rock shaft 119 is rocked in a counter-clockwise direction (viewing Fig. 3) at selected times by a lever 122 keyed to rock shaft 119, the upper end of which lever extends into the path of travel of blocks 123 secured at proper intervals to chain 34, which blocks engage and move lever 122 to the left (viewing Fig. 3) thus rocking shaft 119 in a counter-clockwise direction. When a block 123 passes over lever 122, rock shaft 119 is returned to initial position by the action of a spring 124. Blocks 123 are located on chain 34 relative to spaces between box blanks or box parts where it is desired that the wires shall be severed and fasteners supplied. As shown in Fig. 3, blocks 123 are located immediately behind blocks 33 which move the carriage 30 as it is desirable that the wire-severing and fastener-supplying mechanism be thrown into operation at approximately the same time that the carriage 30 starts to move with the work. It will be understood, however, that one block might be employed to move the carriage and the lever 122 without departing from the invention.

When clutch members 105 and 107 have been thrown into engagement as just described, shaft 80 will be given one revolution, the cam 111 automatically disconnecting the clutch members when it engages rod 112 and holding clutch member 105 out of engagement with clutch member 107 until the plunger 114 forces rod 112 out of engagement with cam 111.

Pinion 81, which is revolubly mounted on shaft 9, is revolved constantly by a drive pulley 125 on a counter-shaft 126 through sprocket wheel 127 on the hub of pulley 125, sprocket chain 128 and sprocket wheel 129 on the hub of pinion 81. An idler pulley 130 is also mounted on counter-shaft 126 to which the drive belt 135 may be shifted when the machine is stopped. Counter-shaft 126 may be supported by frame-supports 131 located at any convenient point, for instance, to the left of shaft 90 as seen in Fig. 1.

Drive pulley 125 is driven by a belt 135 from a line shaft in the usual manner.

Drive pulley 8 on shaft 9 may be driven by a belt 136 from a line shaft in the usual manner. An idler pulley 134 is provided on shaft 9 to which the drive belt 136 may be shifted to stop the machine.

The operation of the machine is as follows:

The operator sets spacer blocks 7 on work-feeding chains 2 the proper distances apart to position and space adjacent box sections and blanks. He then sets staple-positioning blocks 34 on chain 35 relative to points on the work where staples are desired. He then sets a block 33 and a block 123 on chain 34 relative to each point where a space between box blanks is provided for the wires to be severed and supplied with fasteners. The binding wires and the wires from which the staples are formed having been supplied and threaded in the usual manner, and the box materials having been placed on work-feeding chains 2, the drive belt 135 is shifted to drive pulley 125 on counter-shaft 126 which causes pinion 81 to revolve constantly. Drive belt 136 is then shifted to drive pulley 8, thus causing chains 2, 25 and 34 to move forward synchronously at a uniform speed. As each block 24 reaches the stapling plane, it causes the staplers to operate once to drive a row of staples over the binding wires into the box parts. When the binding wire has been stapled to a box blank and partially stapled to the succeeding blank, a block 33 on chain 34 engages pawl 37 on carriage 30 and moves carriage 30 and the several binding-wire-severing and fastener-supplying units along with the work. At the same time, a block 123 strikes lever 122 on rock shaft 119 rocking said shaft in a counter-clockwise direction (viewing Fig. 4) and causing levers 118 and 116 to force plunger 114 down against rod 112 thus releasing rod 112 from its engagement with cam 111 on pinion 110 and permitting spring 106 to force clutch member 105 into engagement with clutch member 107. When said clutch members interengage, pinion 109 acting on pinion 110 causes shaft 80 to revolve until cam 111 again contacts with rod 112 whereupon shaft 80 stops and remains inactive until the next block 123 on chain 34 strikes lever 122. One revolution of shaft 80 causes the binding-wire-severing and fastener-supplying units to perform their several operations as now described. Pinion 90 on one end of shaft 80 acting through pinion 89, shaft 86, telescopic universal joint connection 87, shaft 84, pinion 83 and pinion 82 causes one revolution of cam shaft 65. The rotation of cam shaft 65 causes cam 78 to rotate thus permitting the lowering of the several units from the position shown in Fig. 9 to the position shown in Fig. 12, in which latter view the jaws 53 and 54 of the twister heads have received the binding wire W between them and the pivoted knife 71 has snapped in beneath the binding wire while knife 72 is being forced down to cut the wire by the action of cam 76 on roller 77. After the wire has been received between jaws 53 and 54 and severed by the cutter, cam 64 acting on roller 66 on sleeve 61 starts to force sleeve 61 downward, thereby causing casings 58 to descend on twister heads 50 and close jaws 53 and 54 upon the wires. At the same time, cams 78 start to raise the units and cams 68 acting on rollers 69 start to separate the twisting heads 50. Casing 58 continues to move downward on twister heads 50 forming the bight around the forming stud 55 and causing clamping arms 59 to clamp the legs of the bight when said arms strike cam 60 on twister head 50, as shown in Fig. 13. With the parts in the position shown in Fig. 13, the mutilated pinion 101 on the other end of shaft 80 acting through pinion 100, shaft 97, telescopic universal joint connection 98, shaft 95, pinion 94, pinion 93 and gears 92 and 91 causes rotation of twister shafts 52, which acting through pinions 57 and 56 cause rotation of twister heads 50 to twist the legs of the bights as shown in Fig. 14. When the twisting operation is completed, cam 64 permits springs 63 to raise sleeve 61 thus raising casings 58 and clamping arms 59 above the jaws 53 and 54 and permitting said jaws to open and release the finished bight when spring 67 returns twister heads 50 to the closed position shown in Fig. 9. As this operation is completed, pawl 37 rides up on cam 41 permitting weight 43 to return carriage 30 to initial position against stop 133.

It will be noted that the telescopic universal joint connections 87 and 98 permit cam shaft 65 and twister shafts 52 to be operated from a fixed shaft 80 during movement of shafts 65 and 52, both vertically and horizontally. This is particularly advantageous in that it makes it possible to employ operating shafts which move with the work and reciprocate vertically while operating the several mechanisms of the wire-severing and fastener-supplying units.

It will also be noted that the wire-severing and fastener-supplying mechanism operates independently of the movement of the carriage 30 so that when said mechanism is thrown into operation it will complete its operation regardless of whether or not the work and carriage 30 continue to move. In other words, it is not necessary for the carriage 30 to be moving during the operation of the fastener-supplying mechanism. This is particularly advantageous in the intermittent feed type of machine in which the work is moved forward step-by-step.

Obviously, the invention is not limited to the specific embodiment thereof shown for illustration but may be variously embodied without departing from the invention; and certain features of the invention may be used to advantage in various combinations and sub-combinations.

Having described the invention, what is claimed is:

1. A machine for use in making boxes comprising, in combination, means to feed box parts; means to apply binding wire to the box parts; mechanism to supply said wire with fastening means; and a chain having blocks thereon to move said mechanism with the work.

2. A machine for use in making boxes comprising, in combination, means to feed box parts; means to apply binding wire to the box parts; mechanism to supply said wire with fastening means; and blocks moving with the work to propulsively engage and move said mechanism.

3. A machine for use in making boxes comprising, in combination, means to feed box parts; means to apply binding wire to the box parts; mechanism to supply said wire with fastening means; and blocks moving parallel to the moving work for engaging and moving said mechanism.

4. A machine for use in making boxes comprising, in combination, means to feed box parts; means to apply binding wire to the box parts; mechanism to supply said wire with fastening means; and means to move said mechanism with the work at selected times including a series of blocks located relative to predetermined points on the work where it is desired that said mechanism shall operate and acting successively to propel said mechanism with the work.

5. A machine for use in making boxes comprising, in combination, means to feed box parts; means to apply binding wire to the box parts; mechanism to supply said wire with fastening means; means to move said mechanism with the work at selected times including a series of blocks located relative to predetermined points on the work where it is desired that said mechanism shall operate and acting successively to propel said mechanism with the work; and means to return said mechanism to initial position after each movement with the work.

6. A machine for use in making boxes comprising, in combination, means to feed box parts; means to apply binding wire to the box parts; mechanism to supply said wire with fastening means; means to move said mechanism with the work; and separate and independent means for returning said mechanism to initial position.

7. A machine for use in making boxes comprising, in combination, endless work-forwarding chains; means to apply binding wire to box parts; mechanism to supply said wire with fastening means; and means to move said mechanism with the work including a chain movable synchronously with said work-forwarding chains.

8. A machine for use in making boxes comprising, in combination, endless work-forwarding chains; means to move said chains; means to apply binding wire to box parts; mechanism to supply said wire with fastening means; and means to move said mechanism wth the work including a chain equal in length to and movable with said work-forwarding chains.

9. A machine for use in making boxes comprising, in combination, work-forwarding means; binding-wire-applying means; mechanism to supply said wire with fastening means; a carriage for said mechanism; blocks moving with the work to engage and move said carriage; and blocks moving with the work to control the operations of said mechanism.

10. A machine for use in making boxes comprising, in combination, work-forwarding means; binding-wire-applying means; mechanism to supply said wire with fastening means; a carriage for said mechanism; and a chain having blocks thereon to move said carriage and to control the operations of said mechanism.

11. A machine for use in making boxes comprising, in combination, work-forwarding means; binding-wire-applying means; mechanism to supply said wire with fastening means; a carriage for said mechanism reciprocable over the work; means to move said carriage; and means operating independently of the movement of the carriage for operating said mechanism.

12. A machine for use in making boxes comprising, in combination, means to apply binding wire to box parts; mechanism for supplying said wire with fastening means; a carriage for said mechanism; means to move said carriage; and means to operate said mechanism said moving and operating means being separately controlled.

13. A machine for use in making boxes comprising, in combination, means to apply binding wire to box parts; mechanism for supplying said wire with fastening means; a carriage for said mechanism; means to move said carriage; independent means to operate said mechanism; means to control the movement of said carriage; and independent means to control the operations of said mechanism.

14. A machine for use in making boxes comprising, in combination, work-forwarding means; means to apply binding wire to box parts; and mechanism to supply said wire with fastening means, said mechanism being operated independently of the work-forwarding means, whereby when thrown into operation it will complete a fastener-supplying operation regardless of whether the work continues to move or comes to rest.

15. A machine for use in making boxes comprising, in combination, means to apply binding wire to box parts; means to feed the box parts; mechanism for supplying said wire with fastening means, and means to operate said mechanism independently of the feed of the work.

16. A machine for use in making boxes comprising, in combination, means to apply binding wire to box parts; mechanism for supplying said wire with fastening means; a carriage for said mechanism reciprocable over the work; means to reciprocate said carriage; and independent means to operate said mechanism while said carriage is moving or stationary.

17. A machine for use in making boxes comprising, in combination, means for applying binding wire to box parts; and mechanism for supplying said wire with fastening means including wire-severing means comprising a pair of relatively movable cutting members normally suspended above the work, one such member being adapted when lowered to assume a cutting position below the wire and to cooperate with the other member to sever the wire therebetween.

18. A machine for use in making boxes comprising, in combination, means to apply binding wire to box parts; and mechanism for supplying said wire with fastening means including wire-severing means comprising a pivoted cutting member and a vertically reciprocating cutting member both normally maintained above the work, the pivoted cutter being adapted when lowered to snap in beneath the wire to be severed and means to force the vertically reciprocating cutter down against the pivoted cutter to sever the wire between the two.

19. A machine for making wirebound box or crate blanks comprising, in combination, means to apply binding wire to box parts; and mechanism to sever the wire between box parts and supply said wire with fastening means, said mechanism including a pair of relatively movable cutting members normally suspended above the wire to be severed and adapted when lowered to cooperate and sever the wire.

20. A machine for use in making boxes comprising, in combination, means to feed box parts continuously; means to apply binding wire to moving box parts; and means operable upon the moving work to supply said wire with fastening means.

21. A machine for use in making boxes comprising, in combination, means to apply binding wire to box parts; means to feed the box parts; mechanism to supply said wire with fastening means; and means to operate said mechanism while the same is moving with the work including a cam shaft movable horizontally and vertically and a power-communicating connection for rotating said moving cam shaft from a fixed operating shaft.

22. In a machine for making wirebound box blanks by attaching wire to box parts, mechanism for severing the wire between box parts and supplying the severed ends with fastening means comprising wire-manipulating members for gripping, severing, bending and twisting the wire; a cam shaft for operating wire-manipulating members; and means to rotate said shaft while the same is moving with the work being operated upon.

23. In a machine for making wirebound box blanks by attaching wire to box parts, mechanism movable over the work for supplying the wire with fastening means; and a cam shaft movable with said mechanism for operating parts thereof.

24. In a machine for making wirebound box blanks by attaching wire to box parts, mechanism movable over the work for supplying the wire with fastening means comprising wire-manipulating members, for gripping, severing, bending and twisting the wire; and a cam shaft movable with said mechanism for operating certain of said members.

25. In a machine for making wirebound box blanks by attaching wire to box parts, mechanism movable over the work for supplying the wire with fastening means comprising wire-manipulating members for gripping, severing, bending and twisting the wire; a cam shaft for operating said gripping, severing and bending members and shafts for operating said twisting members.

26. In a machine for making wirebound box blanks by attaching wire to box parts, mechanism movable over the work for supplying the wire with fastening means comprising wire-manipulating members for gripping, severing, bending and twisting the wire; a cam shaft for operating said gripping, severing and bending members and shafts for operating said twisting members; and power-communicating connections for operating said moving shafts from a fixed shaft.

27. A machine for making wirebound box or crate blanks comprising, in combination, means to position and feed box parts; means to apply binding wire to the box parts; and mechanism to supply said wire with fastening means, said mechanism being supported by a carriage movable with the work and comprising wire-gripping, severing, bending and twisting members, and means for operating said members including a shaft having cams thereon for raising and lowering said members and other cams for operating said gripping, severing and bending members, and twisting shafts for operating said twisting members.

28. A machine for use in making boxes comprising, in combination, means to apply binding wire to box parts; means to feed the box parts; mechanism to sever the wire between box parts and supply the severed ends with bights; and blocks moving with the work to engage and move said mechanism.

29. A machine for making wirebound box or crate blanks comprising, in combination, means to position and feed box parts; means to apply binding wire to the box parts; mechanism to sever the wire between box parts and form bights on the severed wire ends; a carriage for said mechanism; and means moving with the work to propulsively engage and move said carriage.

30. A machine for making wirebound box or crate blanks comprising, in combination, means to position and fed box parts; means to apply binding wire to the box parts; mechanism to sever the wire between box parts and form bights on the severed wire ends; a carriage for said mechanism; means moving with the work to propulsively engage and move said carriage a predetermined distance; and means to return said carriage to initial position.

31. A machine for making wirebound box or crate blanks comprising, in combination, means to position and feed box parts; means to apply binding wire to the box parts; mechanism to sever the wire between box parts and form bights on the severed wire ends; a carriage for said mechanism; means moving with the work to propulsively engage and move said carriage; and means to control the operation of said mechanism whereby bights will be formed on the wire at predetermined points relative to box part edges.

32. A machine for making wirebound box or crate blanks comprising, in combination, means to position and feed box parts; fastener-setting mechanism for applying binding wire to the box parts; fastener-positioning mechanism to controllably locate fasteners in the work; mechanism to sever the wire between box parts and form bights on the severed wire ends; a carriage for said wire-severing and bight-forming mechanism; means moving with the work to propulsively engage and move said carriage; and means to control the operation of said wire-severing and bight-forming mechanism to locate bights at predetermined points relative to fasteners.

33. A machine for making wirebound box or crate blanks comprising, in combination, means to position and feed box parts; fastener-setting mechanism for applying binding wire to the box parts; means to control the operation of said fastener-setting mechanism to locate fasteners at predetermined points in the work; mechanism to sever the wire between box parts and form bights on said wire; and means to control the operation of said wire-severing and bight-forming mechanism to locate bights at predetermined points relative to box part edges.

34. A machine for making wirebound box or crate blanks comprising, in combination, means to position and feed box parts; fastener-setting mechanism for applying binding wire to the box parts; means to control the operation of said fastener-setting mechanism to locate fasteners at predetermined points in the work; mechanism to sever the wire between box parts and form bights on said wire; means to move said wire-severing and bight-forming mechanism with the work; and means to control the operation of said wire-severing and bight-forming mechanism.

In testimony whereof, I have signed my name to this specification.

SERAPHINE F. BAUWENS.

CERTIFICATE OF CORRECTION.

Patent No. 1,685,626.            Granted September 25, 1928, to

SERAPHINE F. BAUWENS.

It is hereby certified that error appears in the printed specification of the above numbered patent requiring correction as follows: Page 7, strike out lines 119 to 124, comprising claim 20, and insert the following as claim 20:

20. A machine for use in making boxes comprising, in combination, means to apply binding wire to box parts; means to feed the box parts; mechanism to supply said wire with fastening means; and means to operate said mechanism while the same is moving with the work including a cam shaft movable therewith and a power-communicating connection for rotating the same from a fixed operating shaft.;

and that the said Letters Patent should be read with this correction therein that the same may conform to the record of the case in the Patent Office.

Signed and sealed this 27th day of November, A. D. 1928.

(Seal)

M. J. Moore,
Acting Commissioner of Patents.

mechanism to locate bights at predetermined points relative to box part edges.

34. A machine for making wirebound box or crate blanks comprising, in combination, means to position and feed box parts; fastener-setting mechanism for applying binding wire to the box parts; means to control the operation of said fastener-setting mechanism to locate fasteners at predetermined points in the work; mechanism to sever the wire between box parts and form bights on said wire; means to move said wire-severing and bight-forming mechanism with the work; and means to control the operation of said wire-severing and bight-forming mechanism.

In testimony whereof, I have signed my name to this specification.

SERAPHINE F. BAUWENS.

CERTIFICATE OF CORRECTION.

Patent No. 1,685,626.            Granted September 25, 1928, to

SERAPHINE F. BAUWENS.

It is hereby certified that error appears in the printed specification of the above numbered patent requiring correction as follows: Page 7, strike out lines 119 to 124, comprising claim 20, and insert the following as claim 20:

20. A machine for use in making boxes comprising, in combination, means to apply binding wire to box parts; means to feed the box parts; mechanism to supply said wire with fastening means; and means to operate said mechanism while the same is moving with the work including a cam shaft movable therewith and a power-communicating connection for rotating the same from a fixed operating shaft.;

and that the said Letters Patent should be read with this correction therein that the same may conform to the record of the case in the Patent Office.

Signed and sealed this 27th day of November, A. D. 1928.

(Seal)

M. J. Moore,
Acting Commissioner of Patents.